UNITED STATES PATENT OFFICE.

JOHN ALBERT SEFTON, OF CLEVELAND, OHIO.

IMPROVEMENT IN HARNESS LIQUID BLACKINGS.

Specification forming part of Letters Patent No. 157,936, dated December 22, 1874; application filed August 28, 1874.

*To all whom it may concern:*

Be it known that I, JOHN ALBERT SEFTON, of Cleveland, in the county of Cuyahoga and State of Ohio, have invented a certain new and Improved Liquid Blacking Compound for Harnesses, &c.; and I do hereby declare that the following is a full, clear, and complete description thereof.

The nature of this invention relates to a compound for blacking for harness and other leather; and the object of the same is to give to the harness or other leather a fine black polish, and which at the same time is a preservative of the leather by rendering it soft, flexible, and impervious to water.

The ingredients, their proportions, and the manner of compounding them are substantially as follows: To about four gallons of alcohol are added sixty-four ounces of orange shellac, sixty-four ounces pine-tar, one pint neats-foot oil, four ounces oil of almonds or other perfume, to give an agreeable odor, and lamp-black sufficient to give the mixture a full black color.

The manner of compounding the several above-specified ingredients is as follows: The shellac is first cut or dissolved by adding thereto four gallons of good alcohol, and this mixture is then allowed to stand twelve hours, or until the shellac is dissolved; then add the pine-tar and lamp-black, the tar and lamp-black first being mixed together before they are added to it, by combining enough of the said shellac preparation to make the tar and lamp-black mixture of free consistency, so that it will unite easily with the said shellac and alcohol preparation. To this mixture is then added the neats-foot oil and mixed in, and then to the whole mass the oil of almonds is added, when it is thoroughly agitated until all the ingredients are completely commingled; the blacking is then fit for use.

I do not confine myself to the exact proportions of the ingredients specified, as the proportions may be slightly changed without changing the essential nature of the compound.

This blacking is applied to the harness with a sponge by simply spreading it thereon, which after a few minutes becomes dry and hard, and of a fine glossy black, and which will not rub off and is not affected by water, it being nearly, if not completely, water-proof. The leather also becomes soft and flexible, and not liable to crack, its effects upon the leather being wholly innoxious.

What I claim as my invention, and desire to secure by Letters Patent, is—

The herein-described compound for harness-blacking, consisting of shellac, alcohol, tar, lamp-black, and neats-foot oil, substantially as set forth.

JOHN ALBERT SEFTON.

Witnesses:
J. H. BURRIDGE,
A. F. CORNELL.